US006915001B2

(12) United States Patent
Tachibana et al.

(10) Patent No.: US 6,915,001 B2
(45) Date of Patent: Jul. 5, 2005

(54) ELECTRONIC WATERMARKING METHOD AND SYSTEM

(75) Inventors: Ryuki Tachibana, Yamato (JP);
Shuhichi Shimizu, Yokohama (JP);
Seiji Kobayashi, Yokohama (JP); Taiga Nakamura, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 09/894,043

(22) Filed: Jun. 28, 2001

(65) Prior Publication Data

US 2002/0061118 A1 May 23, 2002

(30) Foreign Application Priority Data

Jun. 29, 2000 (JP) ........................................ 2000-196396

(51) Int. Cl.[7] ................................................. G06K 9/00
(52) U.S. Cl. ....................................................... 382/100
(58) Field of Search ................................. 382/100, 232, 382/248, 250, 280, 283; 380/210, 216, 232, 236, 237, 238, 252, 253, 254; 713/176; 348/460, 465; 386/94; 725/20, 22; 704/200.1, 273; 381/73.1; 84/648

(56) References Cited

U.S. PATENT DOCUMENTS 5,475,789 A * 12/1995 Nishiguchi .................. 704/200
6,209,094 B1 * 3/2001 Levine et al. ............... 713/176
6,425,082 B1 * 7/2002 Matsui et al. ............... 713/176
6,529,506 B1 * 3/2003 Yamamoto et al. ......... 370/389

OTHER PUBLICATIONS

Japanese Publication No. 10–056557 published on Feb. 24, 1998.
Japanese Publication No. 2000–175019 published on Jun. 23, 2000.
Japanese Publication No. 11–212462 published on Aug. 6, 1999.
Japanese Publication No. 2000–013585 published on Jan. 14, 2000.

* cited by examiner

*Primary Examiner*—Andrew W. Johns
*Assistant Examiner*—Shervin Nakhjavan
(74) *Attorney, Agent, or Firm*—Louis P. Herzberg

(57) ABSTRACT

The present invention provides a watermarking method, apparatus and system for embedding additive information in digital data, in which one frame is defined as including samples extracted from digital data and a current frame is defined as a frame that is overlapped by samples of a preceding frame. Included are: a transformation unit, for multiplying a frame extracted from digital data by a window function and performing a Fourier transform on the digital data; an embedding unit, for employing bit information and a frequency band to change the amplitude of the frequency component in the digital data; a transformation unit, for performing an inverse Fourier transform to return the frequency component whose amplitude has been changed by the frequency domain embedding unit; and a frame generator, for multiplying the time domain signal and superimposing overlapped frames to generate a frame wherein the additive information is embedded.

16 Claims, 14 Drawing Sheets

Time axis and frequency axis

Frame

Amplitude change

Perform windowing, superimposing frames and outputting them along a time axis

No frame shift

Shift one frame

Cycle synchronization

Provide a difference in reliabilities

Discrimination and equalization of reliability

Diagonal embedding whose speed can be increased

Example of bit information embedding positions being changed as time elapses

Insertion of non — information embedding positions

Embedding of information for which the bit is inverted at cycle 2T

Other signal (e.g. Sync signal)

Use of information other than bit information

ELECTRONIC WATERMARKING METHOD AND SYSTEM

FIELD OF THE INVENTION

The present invention relates to an electronic watermarking technique for digital data, and in particular to a practical and robust electronic watermarking technique.

BACKGROUND

Conventionally, electronic watermarking techniques fall into a category wherein a theoretical electronic watermarking method is applied unchanged for a variety of products, and no truly practical technique has been provided that can prevent the analyzation of an embedding algorithm. As an example, an electronic watermarking technique for digital data, an embedding and detection method used for a frequency domain, is disclosed in U.S. Pat. No. 5,687,236. According to this conventional electronic watermarking technique, embedded additive information is detected so that it can be synchronized with information (embedding start information) indicating the start of embedding. With this method, however, in addition to the additive information that originally is embedded, a synchronization signal is provided that must be used when detecting the embedded additive information. This signal must, therefore, be detected first, and accordingly, additional time is required for this purpose. Further, when a third party, with larcenous intent, detects a synchronization signal, that party can easily analyze and extract all the embedded information. Therefore, it is generally acknowledged that a need exists for a practical and robust electronic watermarking technique.

SUMMARY OF THE INVENTION

To resolve the problems inherent to conventional electronic watermarking techniques, it is one object of the present invention to provide a practical and robust electronic watermarking method and system.

It is another object of the present invention to provide an electronic watermarking method and system for which, when they are employed for the detection of embedded additive information, a synchronization signal is not required.

It is an additional object of the present invention to provide an electronic watermarking method and system for reducing the time required for detecting embedded additive information.

It is a further object of the present invention to provide an electronic watermarking method and system for protecting an embedding algorithm and preventing it from being easily analyzed.

BRIEF DESCRIPTION OF THE DRAWINGS

These and other objects, features, and advantages of the present invention will become apparent upon further consideration of the following detailed description of the invention when read in conjunction with the following drawing figures.

DETAILED DESCRIPTION OF THE INVENTION

Figure 1:
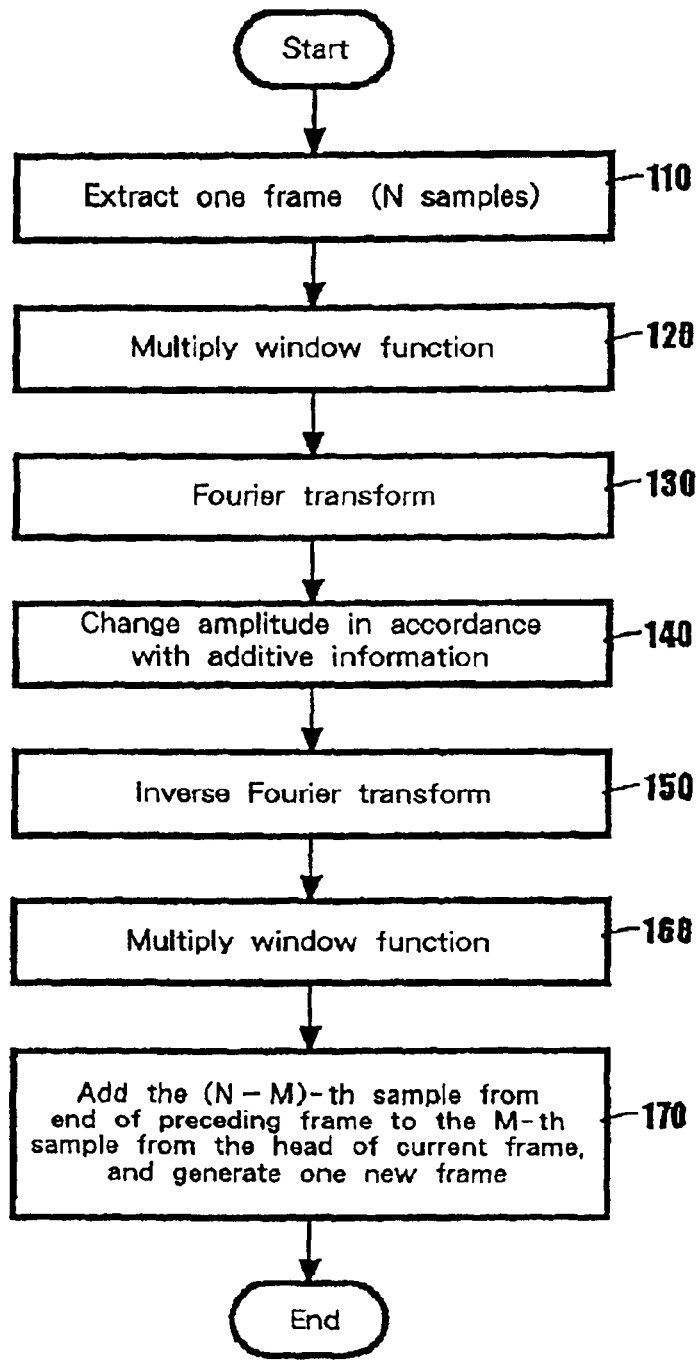
FIG. 1 is an example of a flowchart for a practical and robust electronic watermark embedding method according to the invention.

The present invention provides methods, systems and apparatus to achieve these and other objects. Thus, according to a first aspect of the invention, an electronic watermarking system, for embedding additive information in digital data, for which one frame is defined as including N samples extracted from digital data and a current frame is defined as a frame that is overlapped by M samples ($0<M \leq N/2$) of a preceding frame, comprises: a frequency domain transformation unit, for multiplying a frame extracted from digital data by a window function, and for using the results to perform a Fourier transform and thus obtain a frequency component for the digital data; a frequency domain embedding unit, for employing bit information for additive information, and a frequency band for the frequency component to change the amplitude of the frequency component in the digital data obtained by the frequency domain transformation unit; a time domain transformation unit, for performing an inverse Fourier transform to return, to a time domain signal, the frequency component whose amplitude has been changed by the frequency domain embedding unit; and an additive information embedding frame generator, for multiplying, by a window function, the time domain signal obtained by the time domain transformation unit, and for superimposing overlapped frames to generate a frame wherein the additive information is embedded.

Advantageously, to change the amplitude of the frequency component of the digital data, the frequency domain embedding unit employs bit information for additive information and the values of a mask, determined in advance in accordance with a frequency band, with which the frequency component is to be increased or decreased. advantageously, the values of the mask corresponding to all the frequencies included in one frequency band are equalized.

Advantageously, as the frequency increases, the width of the frequency band is extended.

According to a second aspect of the invention, an electronic watermark detection system, for detecting additive information embedded in digital data, comprises: a frequency domain transformation unit, for multiplying a frame extracted from digital data by a window function, and for performing a Fourier transform to obtain a frequency component from the digital data; an amplitude storing unit, for obtaining amplitudes for the frequency components acquired by the frequency domain transformation unit, and for storing a number of the amplitudes that equals a predetermined frame count; a cycle synchronization unit, for employing an amplitude value stored by the amplitude storing unit to designate a bit detection start frame; and a bit detector, for detecting bit information from embedded additive information beginning at the bit detection start frame obtained by the cycle synchronization unit.

Advantageously, the frequency domain transformation unit uses the shorter length of the frame than the length when the additive information is embedded.

Advantageously, in order to designate the bit detection start frame by referring to the amplitude values, the cycle synchronization unit employs calculation results obtained by using the values of a mask that defines, in advance, a frequency component increase or decrease.

According to a third aspect of the invention, an electronic watermarking method, for embedding additive information in digital data, whereby one frame is defined as including N samples extracted from digital data, and a current frame is defined as a frame that is overlapped by M samples ($0<M\leq N/2$) of a preceding frame, comprises the steps of: extracting one frame as a current frame from digital data; multiplying the current frame by a window function; performing a Fourier transform for the resultant current frame to obtain a frequency component for the current frame; changing an amplitude of the frequency component in accordance with bit information for additive information; performing an inverse Fourier transform for the resultant frequency component; multiplying, by the window function, the frequency component obtained using the inverse Fourier transform; and adding an (N-M)-th sample, from the end of a preceding frame processed in the same manner, to an M-th sample, from the head of the current frame, and generating one new frame including N samples.

Advantageously, at the step of changing the amplitude of the frequency component, the amplitude is changed by employing bit information for additive information and the values of a mask, determined in advance in accordance with a frequency band, with which the frequency component is to be increased or decreased.

Advantageously, the values of the mask corresponding to all the frequencies included in one frequency band are equalized.

Advantageously, as the frequency increases, the width of the frequency band is extended.

According to a fourth aspect of the invention, a method for detecting additive information embedded in digital data comprises the steps of: extracting one frame including N samples from digital data; multiplying the frame by a predetermined window function; performing a Fourier transform for the resultant frame to obtain a frequency component of the frame; storing a value for an amplitude of the frequency component; calculating an optimal start frame for additive information detection when the stored amplitude value reaches a predetermined value; and detecting bit information for the additive information beginning at the start frame.

Advantageously, at the step of extracting one frame, uses the shorter length of the frame than the length when the additive information is embedded.

Advantageously, at the step of calculating the optimal start frame, calculation results obtained by using the values of a mask, which define, in advance, a frequency component increase or decrease, are employed in order to designate the bit detection start frame by referring to the amplitude value.

According to a fifth aspect of the invention, an electronic watermarking method for embedding in digital data N bits ($N\geq 1$) of additive information comprises the steps of: reading sample values, from digital data, up to an R-th sample ($R\geq 1$); reading sample values, from the digital data, following an (R+1)-th sample; changing the sample values following the (R+1)-th sample in accordance with bit information for additive information; and adding together the values up to the R-th sample in the digital data and the values following the (R+1)-th sample, changed in accordance with the bit information for the additive information.

According to a sixth aspect of the invention, an electronic watermarking method for embedding in digital data N bits ($N\geq 1$) of additive information comprises the steps of: reading a sample value from digital data; starting to change the sample value in accordance with bit information for additive information, excluding a head bit of the additive information; and using the changed sample value to generate new digital data.

According to a seventh aspect of the invention, an electronic watermarking method for embedding in digital data N bits ($N\geq 1$) of additive information comprises the steps of: reading a sample value from digital data; changing the sample value in accordance with bit information for additive information; adding noise at random to the changed sample value; and using the changed sample value to generate new digital data.

According to an eighth aspect of the invention, an electronic watermarking method for embedding in digital data N bits ($N\geq 1$) of additive information comprises the steps of: reading a sample value from digital data; changing the sample value in accordance with bit information for additive information, and setting at random a case wherein a change is not required; and using either the changed sample value or the unchanged sample value to generate new digital data.

According to a ninth aspect of the invention, an electronic watermarking method for embedding in digital data N bits ($N\geq 1$) of additive information comprises the steps of: changing digital data by superimposing, inserting, deleting or shifting a specific sample of the digital data; reading a sample value from the digital data; changing the sample value in accordance with bit information for additive information; and using the changed sample value to generate new digital data.

According to a tenth aspect of the invention, an electronic watermarking method for embedding in digital data N bits (N≧1) of additive information comprises the steps of: expanding or compressing digital data along a time axis; reading a sample value from the digital data; changing the sample value in accordance with bit information for additive information; and using the changed sample value to generate new digital data. advantageously, the expansion/compression rate for the digital data does not exceed 1%.

According to an eleventh aspect of the invention, an electronic watermarking method for embedding in digital data N bits (N≧1) of additive information comprises the steps of: reading a sample value from the digital data; changing the sample value in accordance with bit information for additive information; using the changed sample value to generate new digital data; and expanding or compressing the new digital data along a time axis. advantageously, the expansion/compression rate for the new digital data does not exceed 1%.

According to a twelfth aspect of the invention, an electronic watermarking method for embedding in digital data N bits (N≧1) of additive information comprises the steps of: re-sampling digital data at a sampling frequency r' and reading a sample value from the digital data; changing the sample value in accordance with bit information for additive information; and sampling the changed sample value at the original sampling frequency r to generate new digital data.

According to a thirteenth aspect of the invention, an electronic watermarking method for embedding in digital data N bits (N≧1) of additive information comprises the steps of: sampling digital data at a sampling frequency r' and reading a sample value from the digital data; obtaining a change in the sample value in accordance with bit information for additive information; re-sampling the change at a sampling frequency r for the original digital data; and adding the re-sampled change to the original digital data to generate new digital data.

According to a fourteenth aspect of the invention, an electronic watermarking method for embedding in digital data N bits (N≧1) of additive information comprises the steps of: sampling digital data at a sampling frequency r, and reading a sample value from the digital data; changing the sample value in accordance with bit information for additive information; generating new digital data from the changed sample value; sampling the new digital data at a sampling frequency r', and reading a sample value; and generating newer digital data using the sample value.

According to a fifteenth aspect of the invention, a computer-readable recording medium is provided on which a program for embedding additive information in digital data is stored, the program defining one frame as including N samples extracted from digital data and defining a current frame as a frame that is overlapped by M samples (0<M≦N/2) of a preceding frame, and permitting a computer to execute: a frequency domain transformation function, for multiplying a frame extracted from digital data by a window function, and for using the results to perform a Fourier transform and thus obtain a frequency component for the digital data; a frequency domain embedding function, for employing bit information for additive information, and a frequency band for the frequency component to change the amplitude of the frequency component in the digital data obtained by the frequency domain transformation function; a time domain transformation function, for performing an inverse Fourier transform to return, to a time domain signal, the frequency component whose amplitude has been changed by the frequency domain embedding function; and an additive information embedding frame generation function, for multiplying, by a window function, the time domain signal obtained by the time domain transformation function, and for superimposing overlapped frames to generate a frame wherein the additive information is embedded.

According to a sixteenth aspect of the invention, a computer-readable recording medium is provided on which a program for detecting additive information embedded in digital data is stored, the program permitting a computer to execute: a frequency domain transformation function, for multiplying a frame extracted from digital data by a window function, and for performing a Fourier transform to obtain a frequency component from the digital data; an amplitude storing function, for obtaining amplitudes for the frequency components acquired by the frequency domain transformation function, and for storing a number of the amplitudes that equals a predetermined frame count; a cycle synchronization function, for employing an amplitude value stored by the amplitude storing function to designate a bit detection start frame; and a bit detection function, for detecting bit information from embedded additive information beginning at the bit detection start frame obtained by the cycle synchronization function.

EXAMPLE EMBODIMENTS

Example embodiments of the present invention will now be described while referring to FIGS. 1 to 22. The definitions of terms used for the embodiment are shown in Table 1, and the list of symbols is shown in Table 2. In the embodiments of the invention, an explanation will be given for an example method and an example system for employing digital audio data as example digital data for electronic watermarking. However, the electronic watermarking method and system can be applied in the same manner for digital moving picture data (MPEG, etc).

<First Embodiment>

An explanation will be given for a practical and robust electronic watermarking method and system according to a first embodiment for which frame synchronization for digital audio data is not required.

An embedding system comprises the following functions.

(1) Frequency domain transformation unit
   extraction of samples
  Extracts N samples from digital audio data.
   multiplication of window function
  Multiplies the extracted digital audio data by a window function.
   FFT
  Performs a FFT to obtain a frequency component.

(2) Frequency domain embedding unit
  The frequency domain embedding unit changes the amplitude of the frequency component, obtained by the frequency domain transformation unit, in accordance with bit information for additive information and the frequency band of the frequency component. During this process, the frequency domain embedding unit applies an auditory psychological model for the frequency component, and calculates a permissible range wherein even when the amplitude is changed, such a change is not discerned by human beings. Then, within the permissible range, the frequency domain embedding unit changes the frequency component of the digital audio data.

(3) Time domain transformation unit
  The time domain transformation unit performs an IFFT for the frequency component that has been changed. By using an inverse Fourier transform, the time domain transformation unit returns, to a time domain signal, the frequency component whose amplitude was changed.

(4) Additive information embedding frame generator

The additive information embedding frame generator multiplies, by a window function, a time domain signal obtained by the time domain transformation unit, and superimposes overlapping (adjacent) frames to generate a frame in which additive information is embedded.

A detection system comprises the following functions.

(1) Frequency domain transformation unit extraction of a sample

Extracts N samples from input digital audio data.

multiplication of a window function

Multiplies extracted digital audio data by a window function.

FFT

Performs a FFT to obtain a frequency component.

(2) Amplitude storing unit

Obtains an amplitude from a frequency component, and stores amplitudes in a number equivalent to a predetermined frame count.

(3) Cycle synchronization unit

The cycle synchronization unit designates a bit detection start frame based on the amplitude value stored by the amplitude storing unit. Values detected by the frequency domain detector are stored in a number equivalent to a predetermined frame count, and a search of the stored values is performed for the greatest absolute value, which subsequently is output as a frame shift. That is, a frame shift is effected in order to determine which frame should be the first for bit detection.

(4) Bit detector

The bit detector detects bit information for embedded additive information, beginning at the detection start frame designated by the cycle synchronization unit. Each bit is detected and output, based on the frame shift effected by the cycle synchronization unit.

FIG. 1 is an example of a flowchart for a practical and robust electronic watermark embedding method according to the embodiment. First, at step 110 one frame (N samples) is extracted from input digital data. At step 120 the extracted frame is multiplied by a window function, and at step 130 a Fourier transform is performed for the resultant frame. As a result, the frequency component of the frame is obtained. Then, at step 140, the amplitude of the frequency component of the frame transformed into the frequency domain is changed in accordance with the additive information, while the phase of the frequency component is maintained. At this time, whether the amplitude should be increased or reduced is determined by using bit information for the additive information to be embedded in the frame and the sign of a mask corresponding to the frequency band of the frame. A change value determined by an auditory psychological model unit is employed as the amount the amplitude is to be changed. It should be noted that this change value is so calculated that, even when digital data is altered, no change in tone quality is discernible by human beings. At step 150, an inverse Fourier transform is performed for the frequency component in which the information has been embedded (the frequency component whose amplitude is changed) to return the frequency component to a signal in the time domain. At step 160, the obtained signal in the time domain is again multiplied by the window function. Finally, the resultant frame is superimposed on the preceding frame to generate a frame wherein additive information is embedded.

Figure 2:
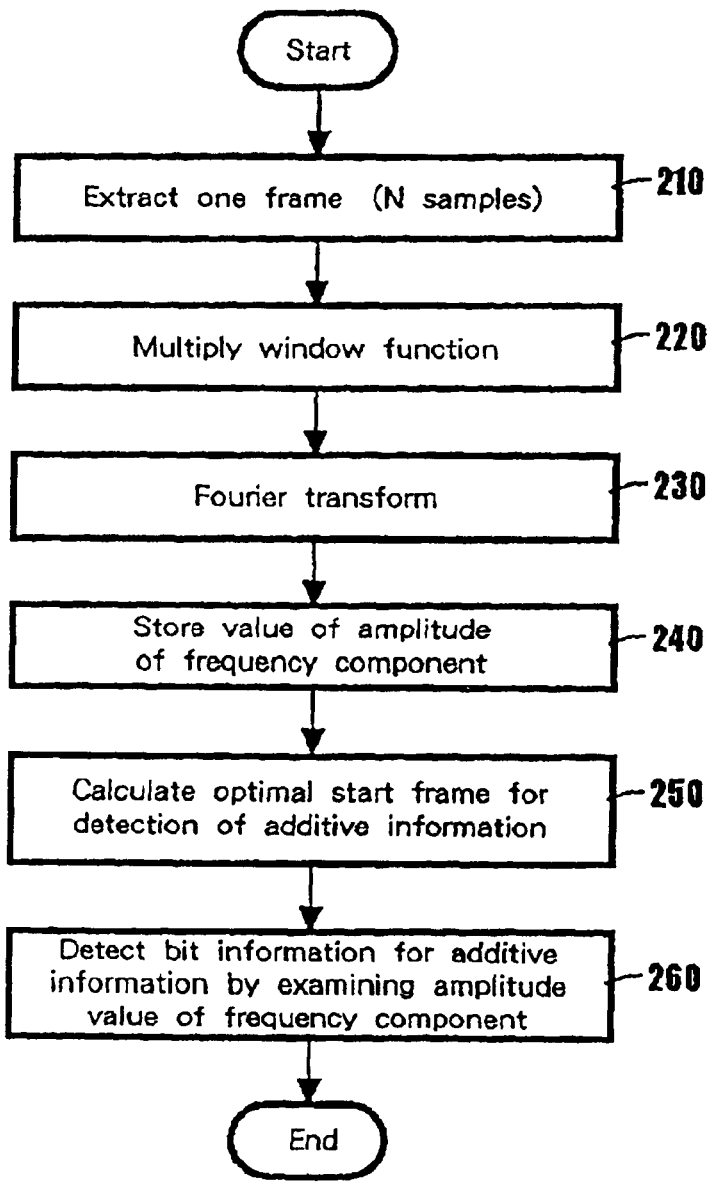
FIG. 2 is an example of a flowchart for a practical and robust electronic watermark detection method according to the invention.

FIG. 2 is an example of a flowchart for a practical and robust electronic watermark detection method according to the embodiment. First, at step 210 one frame (N samples) is extracted from input digital data. At step 220, the extracted frame is multiplied by a window function, and at step 230 a Fourier transform is performed for the resultant frame. As a result, the frequency component of the frame is obtained. Then, at step 240, the frequency components of the frame transformed in the frequency domain are stored in a number equivalent to a predetermined frame count. When the count of the stored frequency components equals the predetermined frame count, a search of the detected values is performed to locate the greatest absolute value, which subsequently is output as a frame shift (the head position of a unit). This calculation is performed using a specific mask, and a detected value is obtained with the assumption that the specific frame is located at the head position. Finally, at step 260, the detected value is selected, based on the obtained frame shift, and is compared with the frequency to determine the bit information for embedded additive information.

Equations/Expressions

In the following description all equations relating to the present invention are tabulated at the end of the text portion of this specification just prior to the claims. Each equation is given an expression number which is indicated at the place in the text below where the expression belongs.

Standard Embedding and Detection Method

The processing performed by the embedding and detection method of the embodiment will now be described.

Additive Information to be Embedded

First, additive information to be embedded is represented as a symbol. The additive information consists of a bit sequence of 1s and 0s, in which all the 0s are replaced by −1s to prepare an array.

[Expression 1]

According to this method, each bit of the additive information is allocated to a frequency band having a specific width.

[Expression 2]

Figure 3:
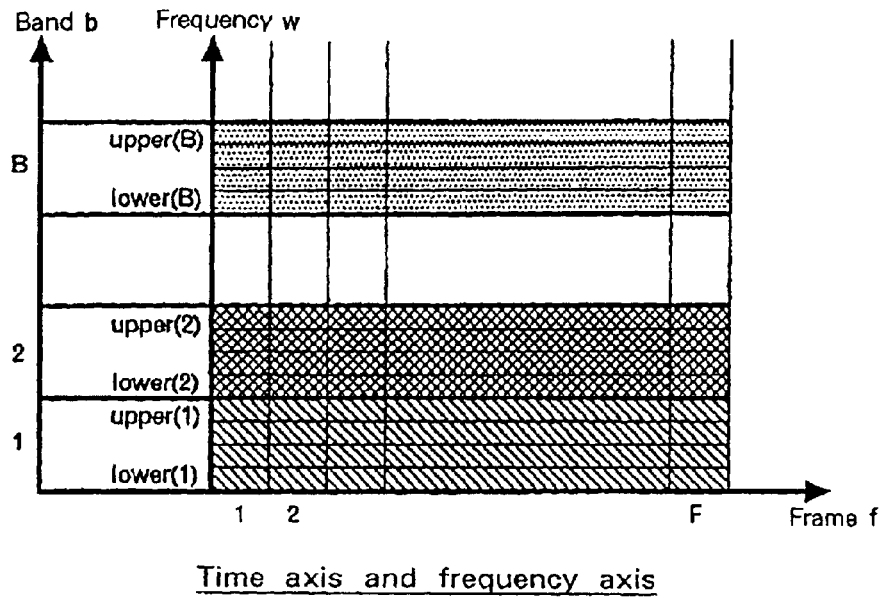
FIG. 3 is an example of a graph for explaining a time axis, a frequency axis and bit embedding.

This expression indicates that the b-th bits from frequency lower(b) to frequency upper(b) are allocated to the frequency band, and that all the information $C_w$ embedded in the frequencies in this range is defined as $CB_b$. The correlation between the bits and the frequency band is the same for all the frames. FIG. 3 is a graph showing that the frame axis (time axis) is perpendicular to the frequency axis, and that the same bit is always embedded in a specific frequency band (the same bit is represented by the portions sharing the same pattern).

[Mask]

The mask is a matrix of +1s and −1s, and since the embedding system and the detection system must both understand the function of the same mask, for this reason, the mask can serve as a type of secret key. For the embedding system, the mask determines whether a frequency component should be increased or decreased, and for the detection system, the mask determines whether, in the detection formula, a frequency component should be added or subtracted.

[Expression 3]

[Extraction of Samples]

Figure 4:
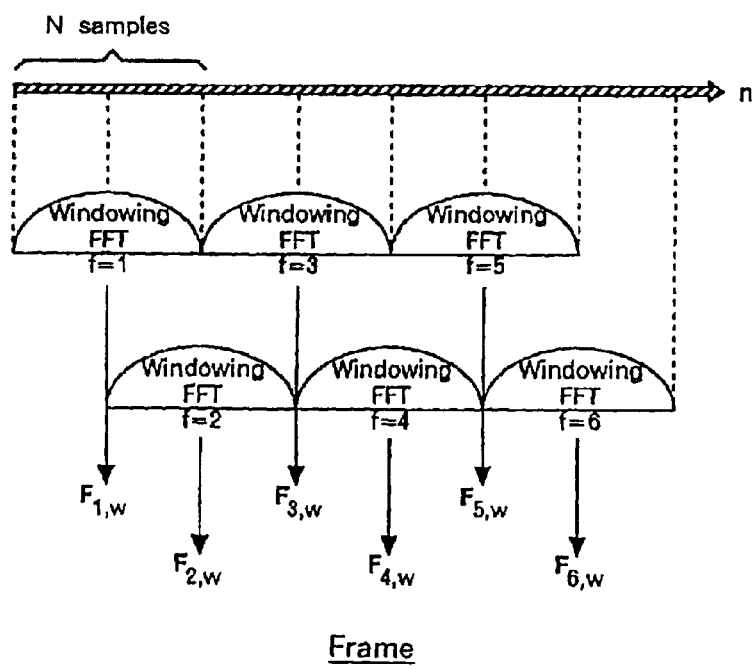
FIG. 4 is a diagram for explaining frame overlapping.

N samples are extracted from digital audio data arranged in a time series, in which the n-th sample of an extracted frame f is represented by a(f, n). Taken collectively, these N samples form processing units called frames, each of which overlaps half of a succeeding frame. FIG. 4 is a diagram showing the overlapping of frames.

[Windowing]

A window function is multiplied to perform a FFT for a frame. Basically, a sine function is appropriate; however, any other function that satisfies the following expression can be employed. This guarantees that the digital audio data will be recovered unless the information is embedded when the frames are superimposed after the windowing has been performed twice.

[Expression 4]

In this expression, n denotes a natural number that is equal to or smaller than N/2. The sine window function is

[Expression 5]

The windowing processing is

[Expression 6]

In this expression 6, n denotes a natural number equal to or smaller than N.

[FFT]

An FFT is performed for aw(f,n) to obtain frequency component $F_{f,w}$.

[Power Embedding]

During the embedding process, only the amplitude (power) is changed, the phase is unchanged.

Figure 5:
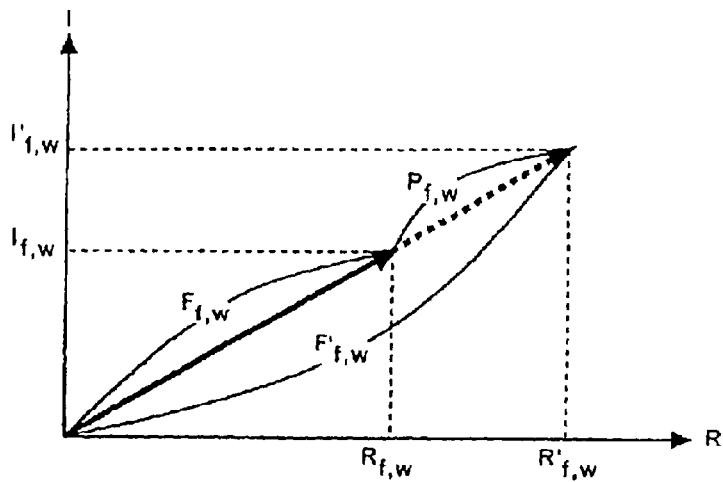
FIG. 5 is a diagram for explaining an amplitude change.

FIG. 5 is a graph for explaining the change in the amplitude.

[Expression 7]

[IFFT]

An IFFT is performed for embedded frequency component $F'_{f,w}$ to obtain aw'(f,n).

[Windowing, Superimposing Frames and Outputting Them Along a Time Axis]

The frame is multiplied by the window function, then the resultant frame is added to the succeeding frame and the obtained frame is output. In this fashion, the embedding of the frame in the digital audio data is completed.

[Expression 8]

Figure 6:
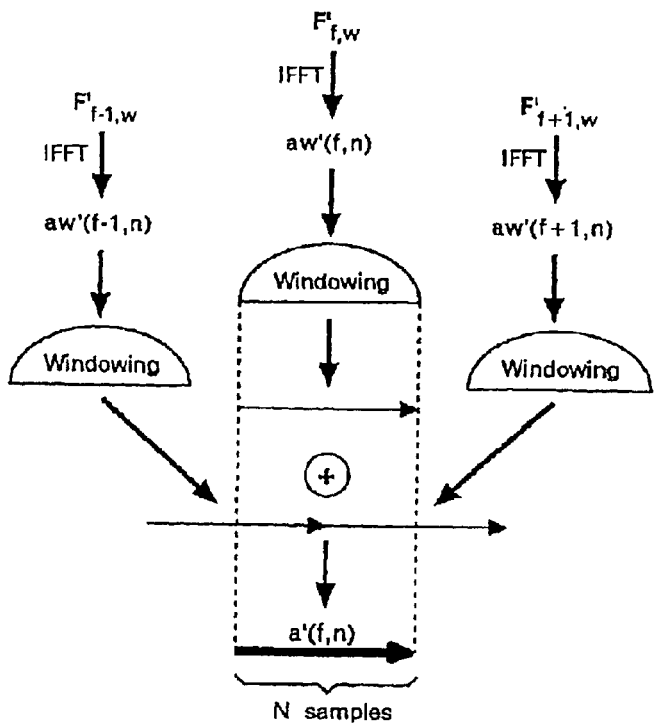
FIG. 6 is a diagram for explaining windowing and frame overlapping.

According to this expression, the first half of a frame is added to the preceding frame, and the second half of the frame is added to the succeeding frame. Further, the left side of the expression refers to the digital audio data after the embedding has been completed. When this data has been output, the embedding process for the frame f is terminated. FIG. 6 is a diagram for explaining the windowing and superimposition of frames.

[Cycle Synchronization]

Figure 7:
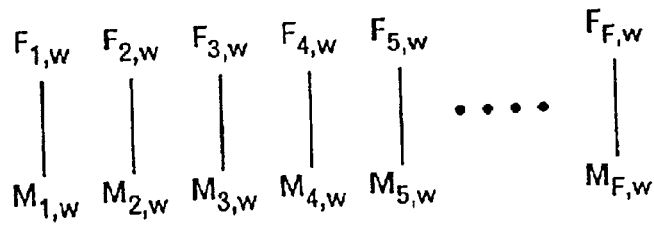
FIG. 7 is a diagram for explaining an example wherein there is no frame shift.
Figure 8:
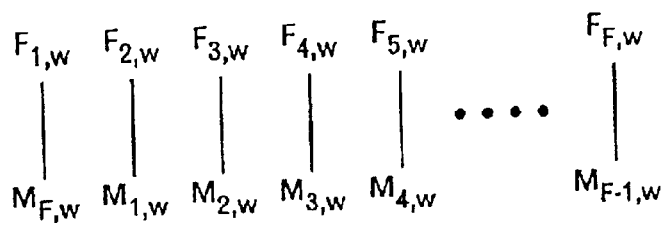
FIG. 8 is a diagram for explaining a one frame shift.
Figure 9:
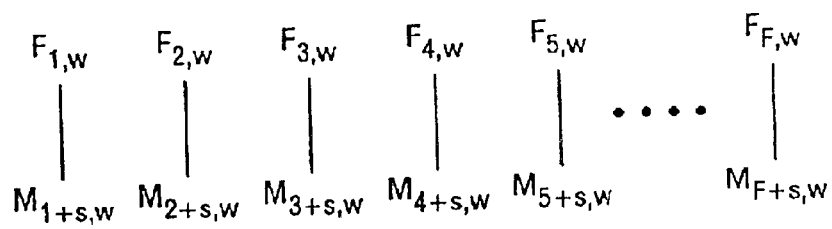
FIG. 9 is a diagram for explaining cycle synchronization.

The detection process is performed in the same manner as the embedding process, up until the FFT process is performed to obtain the frequency component. Thereafter, the amplitude $F_{f,w}$ is obtained for each frequency, and is stored in the buffer. When the storing of amplitudes has proceeded until the requirements for the frame F have been satisfied, cycle synchronization and bit detection can be initiated. Since one part of the digital audio data may be cut off, frame f=1 is not always the first frame when the information is embedded. If the frame is shifted, the mask and the amplitude to be multiplied differ, so that a correct bit can not be detected. FIG. 7 is a diagram showing an example wherein no frame shifting has occurred, and FIG. 8 is a diagram showing an example wherein the shifting of one frame has occurred. Cycle synchronization is a process used to calculate $S_s$, while assuming frame shift s, and to obtain s, with which the maximum $S_s$ is provided. FIG. 9 is a diagram for explaining cycle synchronization. For s, all the integers from 0 to (F−1) are attempted. The expression used to acquire $S_s$ is the addition of the bit detection values. First, when frame shift s is assumed (i.e., $C_w$ was −1 in the embedding process), the bit detection expression for bit 0 is represented by

[Expression 9]

And the bit detection expression for bit 1 (i.e., $C_w$ was +1 in the embedding process) is represented by

[Expression 10]

In this expression, masks for the first subscript (f+s) in $M_{f+s,w}(c)$ are employed in mod F. The addition of these masks to obtain the correct bit is the detection expression used for cycle synchronization. However, since it is unclear whether the b-th bit is +1 or −1, greater values for the masks are selected and added together.

[Expression 11]

The value s with which the maximum $S_s$ is provided is the answer for the frame shifting.

[Bit Detection]

During bit detection, $C_{-,b(s)}$ and $C_{+,b(s)}$ are compared using the frame shift s, obtained during the cycle synchronization process, to determine a bit.

[Expression 12]

[Variation]

An explanation will now be given for an extension method and a replacement method employed in order to improve the basic performances of the embedding and detection systems.

[Threshold Watermark Value and Threshold Bit Value]

By using the frame shift s provided by cycle synchronization, whether a watermark is embedded in the digital audio data can be determined based on the following expression.

[Expression 13]

TMW denotes a threshold constant set in advance. The upper limit for in expression 13 may be reduced, so that a detection value for a bit embedded in a frequency band that is equal to or higher than a specific high frequency can be ignored. Further, whether the detection results obtained for each bit are reliable can also be determined.

[Expression 14]

$T_b$ denotes a threshold value for the b-th bit. A constant difference for each bit can be employed as a threshold value, so that a high threshold value can be set for a bit that should be especially reliable.

[Employment of the Same Mask for Several Sequential Frames for Information Embedding]

When a mask is employed for embedding information for several sequential frames, embedding signals in the overlapped frames strengthen each other and improve the detection efficiency. The same mask are employed for embedding information for several sequential frames.

[Pairing of Every Two frequencies]

When the denominators of expressions 9 and 10 are smaller than the numerators, the detection value can be increased.

Of these methods, one involves the pairing of every two frequencies and the employment of a difference as a denominator. For the embedding, the sign of the odd frequency of the mask must be set opposite the sign of the succeeding arbitrary, even frequency. It should be noted that w denotes an arbitrary natural number equal to or smaller than W/2, and f denotes an arbitrary natural number equal to or smaller than F. For detection, the difference between two adjacent frequencies is obtained.

[Expression 15]

[Dividing a Mask Into Two Parts to Increase the Calculation Speed]

According to the above method, frame shifts of 0 to (F−1) must be attempted during cycle synchronization, and expressions 9 and 10 must be calculated for each F attempts. Therefore, a mask is defined as the product of two masks as follows.

[Expression 16]

When the mask is used for embedding, the detection expression is represented by

[Expression 17]

This expression can be decomposed into

[Expression 18]

In this expression, $q_{b,f}$ does not depend on the frame shift s, and it can be calculated before cycle synchronization is initiated. Further, since $F_{f,q}$ need not be stored in the buffer, the required storage capacity is reduced.

[Changing the Width of a Frequency Band, and Discriminating Between the Reliabilities of the Individual Bits]

Figure 10:
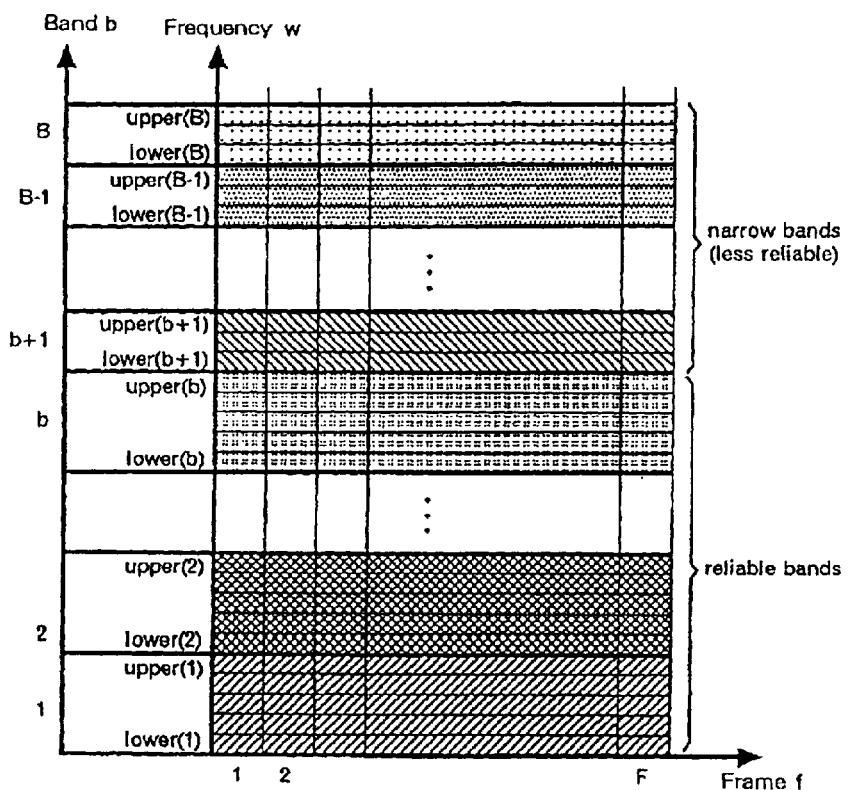
FIG. 10 is a diagram showing an example wherein a wide frequency band is allocated while half of the additive information is regarded as more important.

The additive information to be embedded can be information concerning a copyright, copying and reproduction permission information, or information concerning music names and words, and the importance of the additive information differs greatly, depending on the information type. For example, generally the copying and reproduction permission information is more important than the music names, and is advantageously very robust. According to the method of the invention, the reliabilities of bits can be discriminated between by changing the width of each frequency band. The width of the frequency band is upper(b)-lower(b)+1, and if the width is increased, the robustness and the reliability of the bit are increased. FIG. 10 is a graph showing an example wherein a wide frequency band is allocated while the half including additive information is regarded as more important.

[Equalizing the Reliabilities of Bits]

Assume that the bits of additive information must have equal reliability. When each bit in the degradation process must have equal reliability, such as for a voice compression technique or radio broadcasting, wherein a band-pass filter is effective, the above method is not adequate. Because when the low-pass filter is functional, only the bit embedded in a high frequency band is greatly deteriorated. Thus, all the bits are embedded evenly in all the frequency bands. For example, additive information to be embedded in frame f and frequency w is obtained using the following expression, and a bit is embedded diagonally.

[Expression 19]

Figure 11:
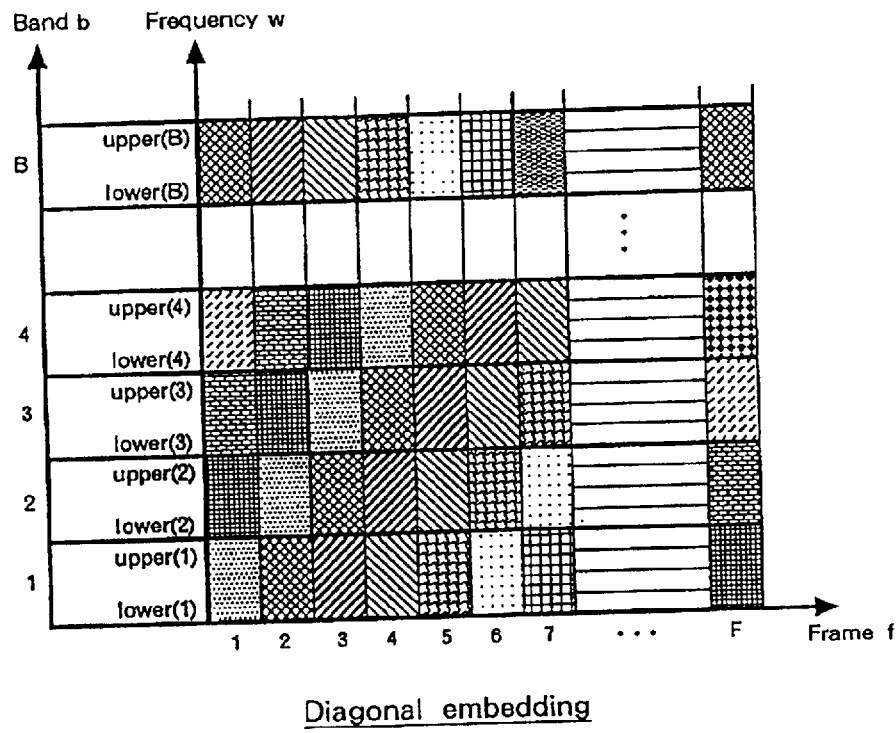
FIG. 11 is a diagram for explaining diagonal embedding.

The values in the parenthesis lower(b−f−1) and upper(b−f−1) in this expression are mod B. The positions represented by this expression for embedding individual bits are as shown in FIG. 11. The rectangles having the same pattern in FIG. 11 (representing positions in the frequency/frame plane) are those carrying the same bit. Since $C_w$ is defined as $C_{f,w}$, the mask is defined as $M_{f,w}(C_{f,w})$

[Expression 20]

For embedding,

[Expression 21]

For detection,

[Expression 22]

The values in parenthesis, lower(b+f−1) and upper(b+f−1), in this expression are mod B. In this embodiment, the method for regularly embedding bits diagonally has been explained; however, the embedding positions need not be arranged diagonally. For example, a secret key can be employed in the embedding process to determine a bit embedding position, and it can be also employed in the detection process to obtain the position of a frequency component used for bit detection. Then, a system that inhibits bit detection by a party who does not know the secret key can be mounted on the above described portion.

[Discrimination and Equalization of Reliability]

Figure 12:
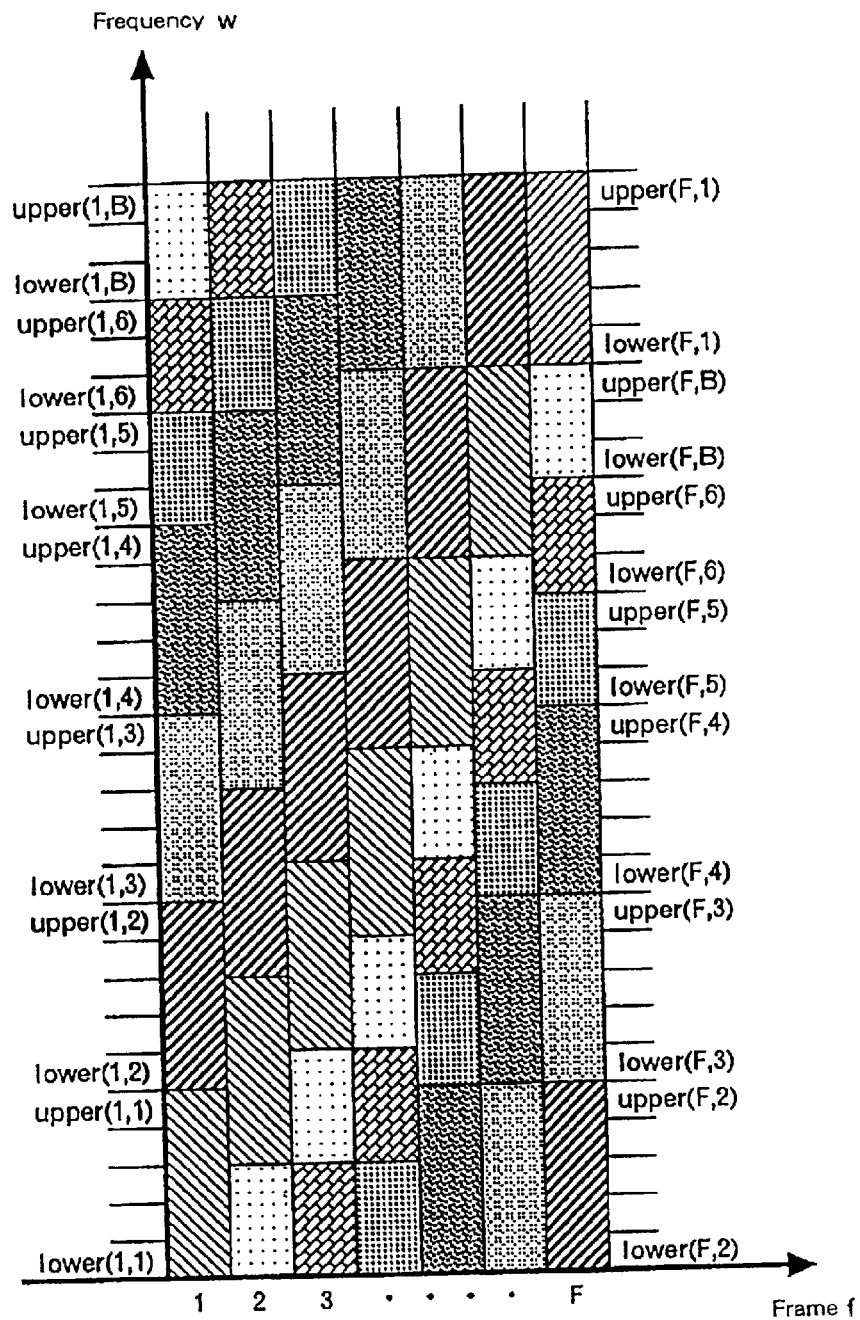
FIG. 12 is a diagram for explaining discrimination and equalization of reliability.

In addition, differences in reliability can be discriminated between while specific robustness relative to the bandpass filter is provided for each bit. As one method, as is shown in FIG. 12, lower(b) and upper(b) are changed for each frame. This means the extension to lower(f,b) and upper(f,b). So long as the embedding and detection systems understand the differences between the lower(f,b) and upper(f,b), an arbitrary value can be employed. In FIG. 12, the same bit is embedded diagonally; however, the diagonal arrangement is not necessarily required. The array of the additive information is defined as

[Expression 23]

Further, the bit detection expression is defined as

[Expression 24]

[Discrimination and Equalization of Reliability and an Increase in Processing Speed]

The method for increasing the processing speed will now be described. The following restrictions are provided for upper(f,b) and lower(f,b).

The upper(f,b)−lower(f,b)+1 width of the frequency band is limited to several types.

For bit embedding positions, only bits having the same width as the frequency band can be replaced.

Figure 13:
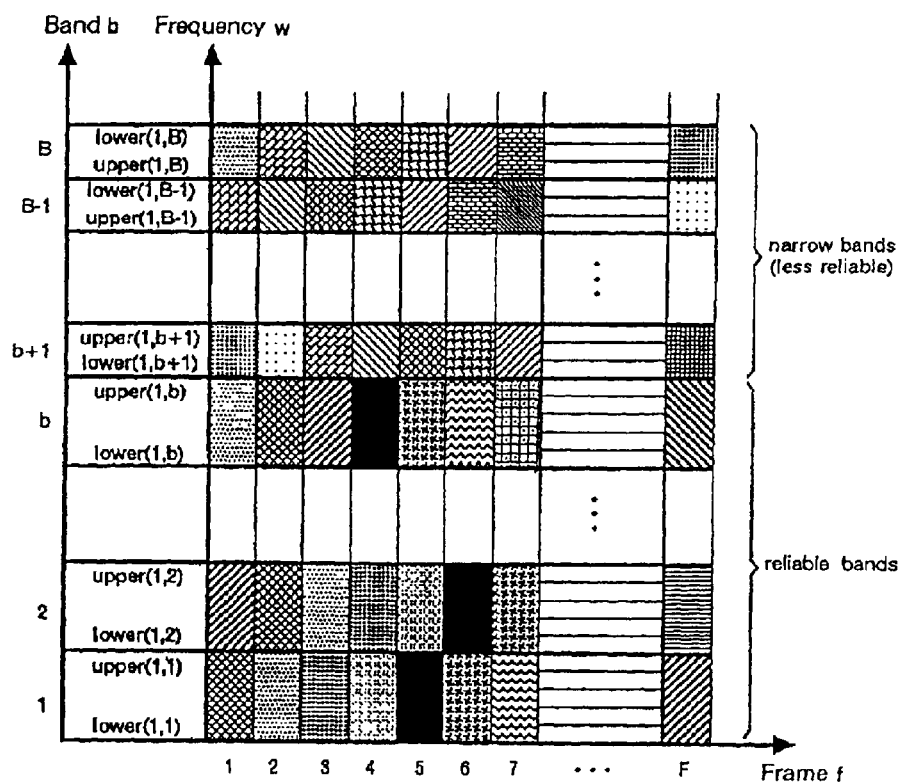
FIG. 13 is a diagram for explaining diagonal embedding that can increase the processing speed.

FIG. 13 is a diagram for explaining diagonal bit embedding that can increase the processing speed. For example, in FIG. 13 the frequency bands are limited to two types, and less reliable bits are embedded diagonally in several narrow frequency bands, while reliable bits are embedded diagonally in wide frequency bands.

[Case Wherein Additive Information is Embedded Using the Positive and Negative Values of a Mask]

According to the above method, different masks are employed for embedding bit 1 and for embedding bit 0. However, bits can be discriminated between and embedded by using the positive and negative values of one mask. In this case, only one mask is required.

[Expression 25]

For embedding, an increase or a reduction is determined in accordance with a bit.

[Expression 26]

For both cycle synchronization and bit determination, only one detection expression is formed, as follows.

[Expression 27]

As a result of this expression, both positive and negative values are obtained. In this case, it is assumed that the first subscript in mask $M_{f+s,w}$ is used for mod F. For cycle synchronization, the absolute values are obtained and added together so as to acquire the maximum, total value.

[Expression 28]

Bit determination is performed by using the positive and negative detection values.

[Expression 29]

[Returning an Embedding Signal to a Time Domain, and Embedding]

When the embedding processing is changed as follows, an error that accompanies windowing or a FFT can be reduced.

(1) Extraction of samples
(2) Windowing
(3) FFT
(4) Generation of an embedding signal The auditory psychological model is applied for a frequency component to calculate a permissible range wherein a human being can not discern a difference, even when the frequency component is changed. An embedding signal is prepared within the permissible range.

(5) IFFT

An IFFT is performed for the embedding signal.

(6) Windowing and superimposing frames, and returning the results along a time axis The resultant frame is multiplied by a window function, and this frame is superimposed on an adjacent frame, so that the embedding signal can be obtained in the time domain.

(7) Addition of the frame to digital audio data

When the obtained frame is added to the original digital audio data, the digital audio data carrying the embedding signal is acquired and output.

For (4), the embedding signal is prepared using the following expression.

[Expression 30]

[Employment of The Same Mask]

When the masks that correspond to all the frequencies included in one frequency band are equalized, robustness relative to the frequency shift can be provided for the audio data. For example, when 5000 Hz is changed to 5050 Hz due to a frequency shift, and when different masks (signs) are used for 5000 Hz and 5050 Hz, the detection is adversely affected. However, when the same mask (sign) is employed, there is no adverse effect.

[Change in the Width of a Frequency Band in Accordance With a Frequency]

Finally, when the width of a frequency band is extended as a frequency increases, robustness relative to an overall change in the frequency, due to a change in the music reproduction speed and a change in the length of a frame, can be provided. For this reason, since all the frequencies are increased by 10% when the reproduction speed is increased by 10%, 500 Hz is changed to 550 Hz and 5000 Hz is changed to 5500 Hz. Therefore, for a higher frequency the frequency shift is greater, and in order to provide for all the frequencies the robustness relative to a frequency shift, for a higher frequency a wider frequency band is necessary.

[Reducing a Frame Length to be Detected]

When the length of a window (i.e., the length of a frame) for detection is shorter than the length of a window for embedding, the effect on the end of the frame being embedded can be reduced. For example, when a mask having the same sign is employed in the frequency band, assume that for embedding one frame consists of N samples and that for detection one frame consists of N/2 samples. As a result, the effect produced by the sign that was embedded in the k-th frequency is observed in the k/2-th frequency. And when one frame consists of N/4 samples for detection, the effect produced by the embedding in the k-th frequency is observed in the k/4-th frequency. This is because, according to the property of a Fourier transform, when the frame length for observation is reduced by half, the frequency resolution that is observed is also reduced by half. That is, in the detection process, when the sign of a mask is shifted a distance equivalent to the difference of a frame length, detection is enabled even when the frames differ. In this embodiment, overlapping of half or less of frames occurs, and signs are embedded while also being changed along a time axis. However, when in a specific frequency band, between adjacent frames along the time axis the signs of masks differ, the embedding effect is canceled out at the portion whereat the frames overlap (for example, when the signs are "++−−" and the overlapping portions of the second and third frames differ). When a short frame length is employed for detection, as is described above, detection is enabled only for a portion that is less affected by an adjacent frame.

<Second Embodiment>

An explanation will now be given for a second example embodiment of the present invention, which provides a practical and robust electronic watermark for digital audio data and which will prevent the unauthorized analyzation of an embedded additive information algorithm. In the following description, "sample" is the expression used when audio data is the target; however, the present invention can be applied for a moving picture by replacing "sample" with "frame", and for a static picture by replacing "sample" with "pixel".

[Determining a Random Embedding Start Position]

Before embedding, the first R samples of the content are skipped, and the embedding is performed beginning at the (R+1)-th sample. Here, R denotes a random variable determined before embedding is initiated.

[Determining a Random Embedding Start Bit or Frame]

Figure 17:
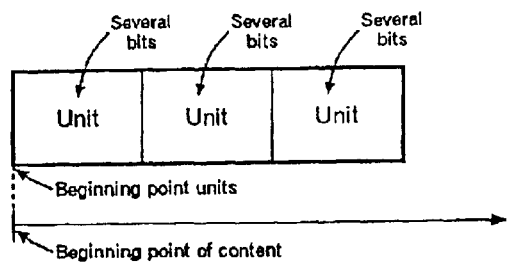
FIG. 17 is a diagram for explaining an embedding start unit.
Figure 18:
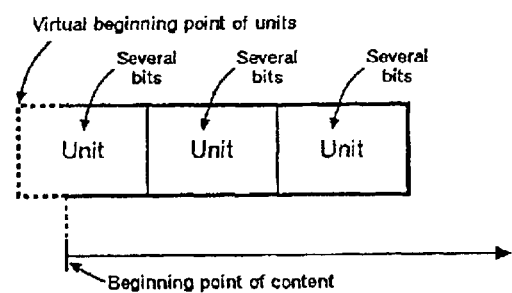
FIG. 18 is a diagram for explaining a virtual embedding start position.

To embed multiple bits, a start bit can be determined at random. This is applicable only in a case wherein before detection a detector performs a process for determining the first bit. In this case, since the first bit should be found through this process, that bit need not always be embedded in the head of the content. The following method can be employed as a modification. According to a method for defining a specific number (F) of samples as one unit and for embedding one or multiple bits therein, the process for finding the location whereat the pertinent unit begins is performed during the detection process. Once the head is found, the head of the content need not match the head of the unit. Thus, the sample of the unit used for the embedding start can be determined at random. FIG. 17 is a diagram showing an embedding start unit, and FIG. 18 is a diagram showing a virtual embedding start point.

[Adding Random Noise]

Not only an embedding signal, but also noise calculated at random is added to the content. If the amount of noise added is sufficiently small, tone quality can be prevented from being affected. And if only random noise added, it can be expected that the detection results will also be less affected.

[Occasionally Adding Merely a Random Signal, Without Performing Embedding]

During the embedding process, a portion whereat only a random signal is to be added without performing embedding is prepared at a timing determined at random. Although this method slightly affects the detection results, since bits in other portions of the content can be detected, this method can be employed when no problem occurs, even when there are portions in which no bits are embedded.

[Performing a Pre-process Before Embedding]

Before the embedding process, a random pre-process is performed to handle the content.

Figure 14:
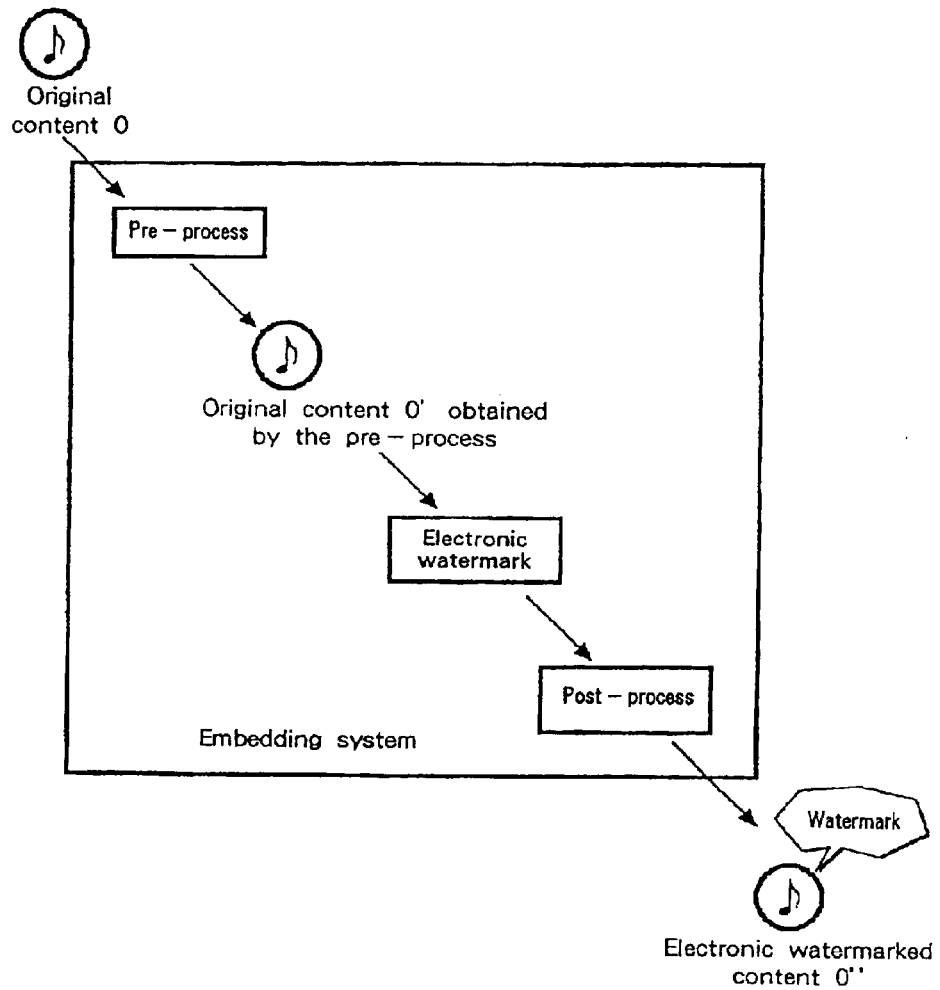
FIG. 14 is a diagram for explaining the pre-process and the post-process for the embedding process.

FIG. 14 is a diagram for explaining a pre-process and a post-process for the embedding process.

Content 0 before being processed [pre-process] content 0' after the pre-process and before the embedding, and [embedding] content 0" after embedding.

When this process is performed internally, a larcenous user can have no knowledge of the "content 0' after the pre-process and before the embedding". Therefore, even if the larcenous user knows the difference between the "content 0 before being processed" and the "content 0' after the embedding", D=0"−0, he or she will have no knowledge of the difference between the "content 0" after the embedding" and the "content 0' after the pre-process and before the embedding", D"=0"−0'. The difference D' includes both the effect D, obtained by embedding, and the effect D'=0'−0, provided by the pre-process, and this prevents the embedding algorithm from being identified. An example pre-process is the overlapping, insertion or omission of a sample, the shifting of a sample, or the expansion/compression of a sample.

[Overlapping, Insertion or Omission of a Sample]

For content, a sample is omitted, a specific sample is repeated, or a specific sample is inserted. This process, for music, is generally called "pitch-preserved time expansion/compression". So long as the omission, overlapping or insertion frequency is sufficiently low (e.g., one sample every 44100 samples per second), the tone quality is not at all affected. For a static picture, this process corresponds to the overlapping, insertion or omission of a horizontal line or a vertical line. For a moving picture, a horizontal line or a vertical line for each static picture may be overlapped, inserted or omitted, or a static picture (a frame) may as one unit be overlapped, inserted or omitted. If the affect on the tone quality or the image quality is kept especially small, the location for the overlapping, insertion or omission of the image must be selected in accordance with the characteristic of the content (this is also generally performed in the pitch-preserved time expansion/compression process). For example, the target location for the omission, overlapping or insertion is limited to the portion wherein similar samples are continued. If the number of samples reduced by omission is adjusted so it is the same as the number of samples increased by overlapping or insertion, the length of the resultant content after the process can be the same as the length of the content before the process.

[Shifting of a Sample]

The content is shifted a distance equivalent to the number of random samples. In other words, a sample is added to the head of the content, or is removed from the head. The number of samples is not always an integer. When the random sample count is a real number other than an integer, the sample values of the content are determined by interpolation. For example, when linear interpolation is employed, the sample value is changed by using

[Expression 31]

In this expression, [r] denotes a maximum integer that does not exceed r, v(x) denotes an x-th sample value before the process, and v'(x) denotes an x-th sample value after the process.

[Expansion/Compression]

A slight expansion/compression of the content can be performed for the object of this embodiment. For example, when the content is linearly expanded or compressed an amount that is equal to or smaller than 1%, the change can not be discerned by human beings. Further, a portion of the content may be expanded and another portion may be compressed, so that the length of the content is maintained. These methods provide great effects, even when the random pre-process is not employed. In other words, even if the pre-process is a decisive algorithm, obtaining the difference D" is difficult, so long as the algorithm can not be identified.

[Performing the Post-process After the Embedding]

When the same process used for the above method, while performing the pre-process for the embedding, is used to perform the post-process for the content produced by the embedding, the same effects that prevent the analyzation of an embedding signal can be provided. In this case, since the embedding signal has also been processed, the robustness relative to the analyzation may be increased. However, since the embedding signal is slightly deteriorated when this post-process is performed, it is predicted that the detection capability will be slightly reduced.

[Calculation of an Embedding Signal After Re-sampling]

Figure 15:
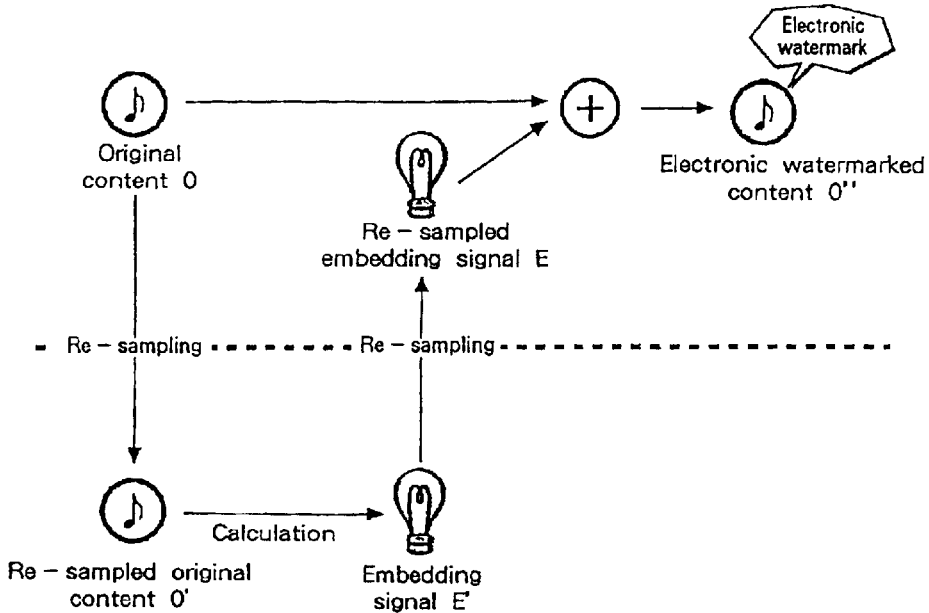
FIG. 15 is a diagram for explaining a method for performing re-sampling and calculating an embedding signal.

This method is similar to the method used to perform the pre-process before the embedding, except that the original content is not changed. For a moving picture and a static picture, the re-sampling corresponds to a change in the number of pixels. The processing used for this method is performed as follows. FIG. 15 is a diagram for explaining the method for performing re-sampling and then calculating an embedding signal.

A sampling frequency of the content 0 before the processing is defined as r.

The content 0 is re-sampled, at a sampling frequency r', to obtain the content 0' after the re-sampling.

A temporary embedding signal E' is obtained for the content 0'. The sampling frequency for the signal E' is also r'.

The temporary embedding signal E' is re-sampled, at the sampling frequency r, to obtain an embedding signal E.

The embedding signal E is added to the content 0 to obtain the content 0" after the embedding.

Figure 16:
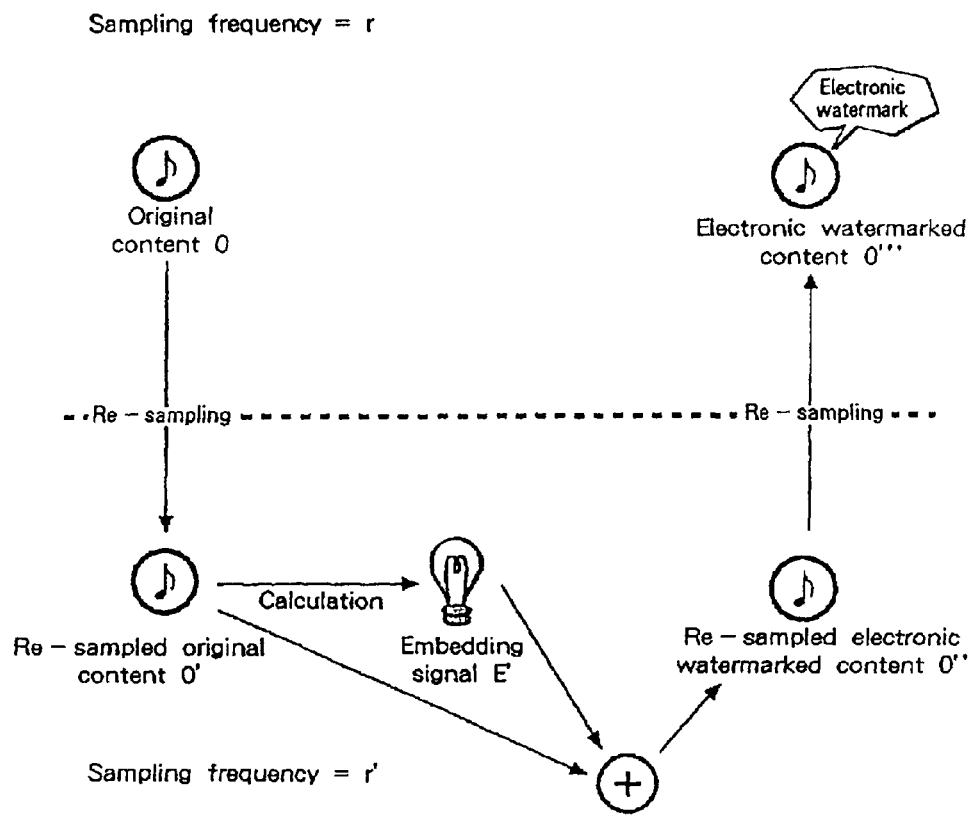
FIG. 16 is an example of a diagram for explaining another method for performing re-sampling and calculating an embedding signal.

As another method, as is shown in FIG. 16 (performing re-sampling and then calculating an embedding signal), A sampling frequency of the content 0 before the processing is defined as r.

The content 0 is re-sampled, at a sampling frequency r', to obtain the content 0' after the re-sampling.

A temporary embedding signal E' is obtained for the content 0'. The sampling frequency for the signal E' is also r'.

The temporary embedding signal E' is added to the content 0', to prepare the content 0", after the embedding is performed at the sampling frequency r'.

The content 0" is re-sampled, at the sampling frequency r to obtain the content 0'''.

The sampling frequency used for embedding may be determined at random for the embedding process. Even when the sampling frequency is not determined at random, it is considered to be an effective means for hiding the algorithm. According to this method, when the sample count (the unit in FIGS. 17 and 18) is employed as a reference to generate an embedding signal, identifying the length of the samples is difficult.

[Setting a Random Interval for Outputting Detection Results]

This is not a method for substantially preventing the analyzation of a difference; however, since this method is the same as another method used to for prevent the analyzation of an algorithm, this method will be explained. According to this method, when the detection results are obtained, instead of an action such as the display of results or the halting of copying, the output is intentionally delayed at specific, randomly determined time intervals. Therefore, the minimum time required for detection is prevented from being identified by a larcenous user.

[Time Change of Bit Information Embedding Position]

When N bits (N≧1) of information is to be embedded as an electronic watermark in image or audio content, the embedding position for each bit of the bit information embedding unit (hereafter referred to as a unit) is changed as time elapses. Thus, even when a specific position in the bit information embedding content is processed or destroyed, disabling of the detection or the alteration of only specific bit information can be avoided. Further, even when the information is the same, it is embedded in different positions, so that the embedding signals do not strengthen each other even if the average of multiple contents is obtained. This is advantageous as it makes it difficult to analyze the electronic watermarking algorithm and the key. Assuming that the n-th bit information embedding position at time t (unit number) is defined as P(n,t), the n-th bit information embedding position at time t+1 can be represented by P(n,t+1)=F(P(n, t)). F(P) denotes a transform operator for changing a bit information embedding position, and P and F(P) have a specific cycle T.
[Expression 32]

Figure 19:
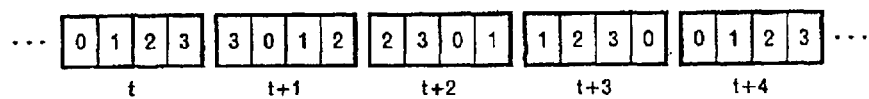
FIG. 19 is a diagram showing a bit information embedding position that is changed as time elapses.

FIG. 19 is a diagram showing an example of P and F(P) wherein four bits of information is embedded in one unit. Each block indicated by a solid line in FIG. 19 represents a unit, and the small numbered blocks in the units represent the positions used for embedding bit information.

In this example, P(n,t)=t+n mode 4 (T=4, n=0, 1, 2, 3). When F(P) is complicated and the length is extended, it is more difficult to assume the bit information embedding position and to disable the detection of specific bit information and to alter specific bit information.

Further, as time elapses, not only the bit information embedding position, but also the interpretation of the embedded information can be changed. In addition, according to this method, when the original target content for electronic watermarking has a correlation along the time axis, the correlation can be canceled because the bit information embedding position is changed as time elapses. As a result, a false positive error ratio, at which the presence of embedded information is determined, even though no information is actually present, can be reduced.
[Detection]

Since the bit information embedding position in the unit is changed as time elapses, the embedded information should be detected in the following manner for each cycle of the change in the bit information embedding position.
[Expression 33]

In this expression, $D(P(n,t))$ denotes an operator for electronic watermark detection at the information embedding position in each unit, and Dn denotes a detection value. When the information embedding bit count $N \geq 2$, and when the content in which information is embedded is processed, the position of a detection value that represents the first information embedding bit can not be identified. Thus, the position of the first information embedding bit must be detected. This method will now be described.

When the information embedding bit count $N \geq 2$, the detection value Dn that represents the position of the first information embedding bit is detected using one of the following methods.
[Insertion of Position Where no Information is to be Embedded]

Figure 20:
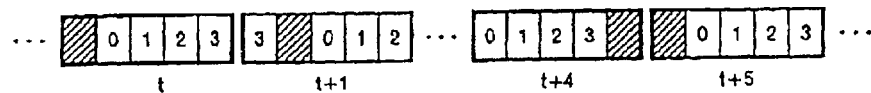
FIG. 20 is a diagram showing an example of the insertion of a non-information embedding position.

At the same cycle T as the bit information embedding position change cycle T, a position whereat no information is to be embedded is inserted as a mark for detecting the first embedded bit. For example, in P and F(P) in FIG. 19, a portion shown in FIG. 20, whereat no information is to be embedded, is inserted. Assume that the shaded portions in FIG. 20 are those whereat no information is to be embedded in the frame. When the detection value of the information embedding position satisfies $|Dn|>Th$, the n-th detection value that satisfies $\min(|Dn|)<Th$ can be obtained as a mark for locating the first embedded bit. It should be noted that Th is a specific threshold value.
[Embedding of Information for Which the Bit is Inverted at Cycle 2T]

Figure 21:
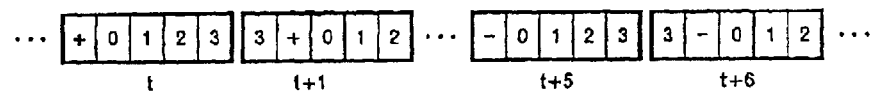
FIG. 21 is a diagram showing an example wherein information is embedded for which the bit is inverted at cycle 2T.

At the same cycle T as the bit information embedding position change cycle T, information for which the bit is inverted at cycle 2T is embedded. FIG. 21 is a diagram showing an example of the embedding of information for which the bit is inverted at cycle 2T. Assume that + or − in FIG. 21 represents the bit-inversion information. During the detection process, at cycle 2T each detection value is calculated based on expression 33, and the n-th detection value that satisfies expression 34 is examined.
[Expression 34]

Then, the first bit of the embedded information can be obtained. In this case, the following expression is established.
[Expression 35]
[Use of Information Other than Bit Information]

Figure 22:
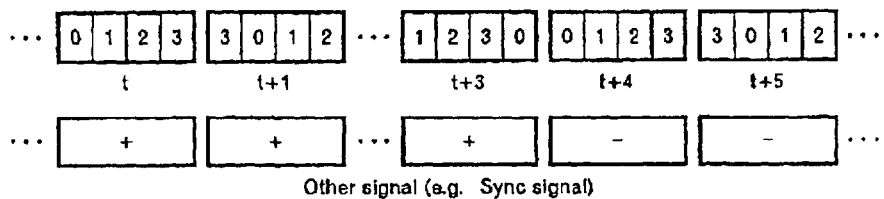
FIG. 22 is a diagram showing an example use of information other than bit information.

The detection value of another signal is employed to detect the first bit for embedded information. For example, when unit positioning information (sink information) is embedded for the electronic watermark detection, during the bit information embedding process the sign of the pertinent signal is inverted for each embedding position change cycle T. Or, a portion having an inverted sign is inserted each cycle T. As a result, in the detection process, when the portion is examined whereat the sign of the positioning information is changed, the position of the first bit can be obtained. FIG. 22 is a diagram showing an example for using information other than the bit information.
[Change of Interpretation of Embedded Information]

To repetitively embed a specific bit in content, the sign of the bit is inverted in accordance with a specific sign sequence. Since the same information is not constantly embedded, the analyzation of information is difficult. The information to be embedded at a specific time is calculated using the following expression.
[Expression 36]

In this expression, B denotes the original bit information (1 or −1; a bit is represented as 0 or −1), and B' (t) denotes a bit, which is actually embedded in the content, having a sign that is inverted as time elapses. M(t) denotes a sign sequence for inverting the embedded information, and a value +1 or −1 is provided. As is described above, when the interpretation of the embedded information is to be changed as time elapses, the detection values Dn should also be obtained by using the interpretation change method M(t) as in
[Expression 37]

However, it should be noted that when the content in which the information is being embedded is processed, the detection of the value $D(P(n, T))$ at each position $P(n, t)$ must be synchronized with M(t). When the correct synchronization is acquired, M(t) is multiplied twice during the embedding and the detection processes to provide a value of +1, so that the original bit information can be obtained. To synchronize the process, one of the following methods is employed.
[+/− Inversion]

Assume $M(t+1)=-M(t)$ is the interpretation method M(t). In order to correctly interpret the embedded bit information, first, the value $D(P(n,t))$ detected at each location $P(n,t)$ is multiplied by a sequence wherein signs are inverted at adjacent times, and the detection value Dn is obtained. When correct synchronization with M(t) is acquired, the bit information can be correctly detected. When the correct synchronization is not obtained, all the signs + and − are inverted, and the resultant sign sequence is multiplied by each value $D(P(n,t))$. Thus, the inverted bit information is detected. Therefore, information Wm for determining whether the inverted bits are detected is embedded at a position other than the bit information embedding position. When the embedded bit information is detected, the sign of the information Wm is examined, and the bit information is re-interpreted as [Expression 38] Then, the embedded bit information is obtained.

[Application of the Maximum Detection Value]

A sequence is prepared that has, as the interpretation change method M(t), a cycle T', and has the maximum value T' only when

[Expression 39]

is established with j=m*T' (m is a natural number). During the detection process, the detection values are calculated by shifting the method M(t), and the shifting distance required to provide the maximum detection value is obtained to effect the synchronization with the interpretation change method M(t).

[Expression 40]

[Employment of Information Other than Bit Information]

The detected bit interpretation M(t) is provided as the detection value for another signal. For example, when unit positioning information (sink information, represented as S(t)) is embedded for electronic watermark detection, during the embedding of the bit information, the sign to which the pertinent signal is inverted is the same as that sign of the M(t). During the detection process, the sink information is detected, and its sign for the sink information is used for bit interpretation.

[Expression 41]

According to the present invention, a practical and robust electronic watermarking method and system are provided that do not require the embedding of a frame synchronization signal. Further, since frame synchronization is not required, the detection time can be reduced. In addition, the storage capacity normally required for a detection system to provide frame synchronization is not necessary. Thus, an electronic watermarking method and system are provided that make it difficult for a larcenous third party to analyze an embedding algorithm.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. For example, in many applications and/or embodiments of the present invention the term 'including' as used herein in this description and in some of the claims often is also given the meaning of the words 'consisting of'.

It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The following is a tabulation of the equations relating to the present invention. The expression number of each equation corresponds with the expression number given at the place in the text above where the expression belongs.

$$CB = [CB_1, CB_2, \ldots, CB_b, \ldots, CB_B]$$ [Expression 1]
$$= [+1, +1, \ldots, -1, \ldots, +1]$$

$$C_w = CB_b \ (\text{lower}(b) \leq w \leq \text{upper}(b))$$ [Expression 2]

$$M = \begin{bmatrix} M_{1,1}(C_1) & \cdots & M_{1,W}(C_W) \\ \vdots & M_{f,w}(C_w) & \vdots \\ M_{F,1}(C_F) & \cdots & M_{F,W}(C_W) \end{bmatrix}$$ [Expression 3]

$$w(n)^2 + w(n+N/2)^2 = 1$$ [Expression 4]

$$w(n) = \sin\left(\pi \frac{n}{N}\right)$$ [Expression 5]

$$aw(f,n) = w(n) \times a(f,n)$$ [Expression 6]

$$F'_{f,w} = F_{f,w} \times \left\{1 + M_{f,w}(C_w) \times \frac{P_{f,w}}{F_{f,w}}\right\}$$ [Expression 7]
$$I'_{f,w} = I_{f,w} \times \left\{1 + M_{f,w}(C_w) \times \frac{P_{f,w}}{F_{f,w}}\right\}$$
$$R'_{f,w} = R_{f,w} \times \left\{1 + M_{f,w}(C_w) \times \frac{P_{f,w}}{F_{f,w}}\right\}$$

$$a'(f,n) = \begin{cases} w(n) \times aw'(f,n) + \\ w(n+N/2) \times aw'(f-1, n+N/2) & (0 < n \leq N/2) \\ w(n) \times aw'(f,n) + \\ w(n-N/2) \times aw'(f+1, n-N/2) & (N/2 < n \leq N) \end{cases}$$ [Expression 8]

$$c_{-,b}(s) = \frac{1}{\sqrt{F}} \sum_{f=1}^{F} \left[ \frac{\sum_{w=\text{lower}(b)}^{\text{upper}(b)} M_{f+s,w}(-1) \times F_{f,w}}{\sqrt{\sum_{w=\text{lower}(b)}^{\text{upper}(b)} (F_{f,w})^2}} \right]$$ [Expression 9]

$$c_{+,b}(s) = \frac{1}{\sqrt{F}} \sum_{f=1}^{F} \left[ \frac{\sum_{w=\text{lower}(b)}^{\text{upper}(b)} M_{f+s,w}(+1) \times F_{f,w}}{\sqrt{\sum_{w=\text{lower}(b)}^{\text{upper}(b)} (F_{f,w})^2}} \right]$$ [Expression 10]

$$S_s = \sum_{b=1}^{B} \max\{c_{-,b}(s), c_{+,b}(s)\}$$ [Expression 11]

-continued $$b - th\ bit = \begin{cases} 1 & (c_{+,b}(s) > c_{-,b}(s)) \\ 0 & (c_{+,b}(s) < c_{-,b}(s)) \end{cases} \quad \text{[Expression 12]}$$

Watermark [Expression 13]

$$\begin{cases} \text{Yes} & \left(\frac{1}{\sqrt{B}} \sum_{b=1}^{B} \max\{c_{-,b}(s), c_{+,b}(s)\} > TWM\right) \\ \text{No} & \text{otherwise} \end{cases}$$

$$b - th\ bit = \begin{cases} 1 & (c_{+,b}(s) - c_{-,b}(s) > T_b) \\ 0 & (c_{-,b}(s) - c_{+,b}(s) > T_b) \\ \text{No reliable bit information otherwise} \end{cases} \quad \text{[Expression 14]}$$

$$c_b = \frac{1}{\sqrt{F}} \sum_{f=1}^{F} \left[ \frac{\sum_{w=\frac{lower(b)}{2}}^{\frac{upper(b)}{2}} M_{f,2w-1}(F_{f,2w-1} - F_{f,2w})}{\sqrt{\sum_{w=\frac{lower(b)}{2}}^{\frac{upper(b)}{2}} (F_{f,2w-1} - F_{f,2w})^2}} \right] \quad \text{[Expression 15]}$$

$$M_{f,W} = MF_f \times MW_w \quad \text{[Expression 16]}$$

$$c_b(s) = \frac{1}{\sqrt{F}} \sum_{f=1}^{F} \left[ \frac{\sum_{w=lower(b)}^{upper(b)} M_{f+s,w} F_{f,w}}{\sqrt{\sum_{w=lower(b)}^{upper(b)} (F_{f,w})^2}} \right] \quad \text{[Expression 17]}$$

$$= \frac{1}{\sqrt{F}} \sum_{f=1}^{F} \left[ MF_{f+s} \frac{\sum_{w=lower(b)}^{upper(b)} MW_w F_{f,w}}{\sqrt{\sum_{w=lower(b)}^{upper(b)} (F_{f,w})^2}} \right]$$

$$c_b(s) = \frac{1}{\sqrt{F}} \sum_{f=1}^{F} [MF_{f+s} \times q_{b,f}] \quad \text{[Expression 18]}$$

$$q_{b,f} = \frac{\sum_{w=lower(b)}^{upper(b)} MW_w F_{f,w}}{\sqrt{\sum_{w=lower(b)}^{upper(b)} (F_{f,w})^2}}$$

$$C_{f,w} = CB_b \ (lower(b-f+1) \leq w \leq upper(b-f+1)) \quad \text{[Expression 19]}$$

$$M = \begin{bmatrix} M_{1,1}(C_{1,1}) & \cdots & M_{1,W}(C_{1,W}) \\ \vdots & M_{f,w}(C_{f,w}) & \vdots \\ M_{F,1}(C_{F,1}) & \cdots & M_{F,W}(C_{F,W}) \end{bmatrix} \quad \text{[Expression 20]}$$

$$F'_{f,w} = F_{f,w} \times \left\{ 1 + M_{f,w}(C_{f,w}) \times \frac{P_{f,w}}{F_{f,w}} \right\} \quad \text{[Expression 21]}$$

-continued $$c_{+,b} = \frac{1}{\sqrt{F}} \sum_{f=1}^{F} \left[ \frac{\sum_{w=lower(b+f-1)}^{upper(b+f-1)} M_{f,w}(+1) \times F_{f,w}}{\sqrt{\sum_{w=lower(b+f-1)}^{upper(b+f-1)} (F_{f,w})^2}} \right] \quad \text{[Expression 22]}$$

$$c_{-,b} = \frac{1}{\sqrt{F}} \sum_{f=1}^{F} \left[ \frac{\sum_{w=lower(b+f-1)}^{upper(b+f-1)} M_{f,w}(-1) \times F_{f,w}}{\sqrt{\sum_{w=lower(b+f-1)}^{upper(b+f-1)} (F_{f,w})^2}} \right]$$

$$C_{f,w} = CB_b \ (lower(f,b) \leq w \leq upper(f,b)) \quad \text{[Expression 23]}$$

$$c_b(s) = \frac{1}{\sqrt{F}} \sum_{f=1}^{F} \left[ \frac{\sum_{w=lower(f,b)}^{upper(f,b)} M_{f+s,w} \times F_{f,w}}{\sqrt{\sum_{w=lower(f,b)}^{upper(f,b)} (F_{f,w})^2}} \right] \quad \text{[Expression 24]}$$

$$M = \begin{bmatrix} M_{1,1} & \cdots & M_{1,W} \\ \vdots & M_{f,w} & \vdots \\ M_{F,1} & \cdots & M_{F,W} \end{bmatrix} \quad \text{[Expression 25]}$$

$$F'_{f,w} = F_{f,w} \times \left(1 + M_{f,w} \times \frac{P_{f,w}}{F_{f,w}}\right) \quad \text{[Expression 26]}$$

$$I'_{f,w} = I_{f,w} \times \left(1 + M_{f,w} \times \frac{P_{f,w}}{F_{f,w}}\right)$$

$$R'_{f,w} = R_{f,w} \times \left(1 + M_{f,w} \times \frac{P_{f,w}}{F_{f,w}}\right)$$

$$c_b(s) = \frac{1}{\sqrt{F}} \sum_{f=1}^{F} \left[ \frac{\sum_{w=lower(b)}^{upper(b)} M_{f+s,w} F_{f,w}}{\sqrt{\sum_{w=lower(b)}^{upper(b)} (F_{f,w})^2}} \right] \quad \text{[Expression 27]}$$

$$S_s = \sum_{b=1}^{B} |C_b(s)| \quad \text{[Expression 28]}$$

$$b - th\ bit = \begin{cases} 1 & (c_b(s) > 0) \\ 0 & (c_b(s) < 0) \end{cases} \quad \text{[Expression 29]}$$

$$\Delta F_{f,w} = M_{f,w}(C_w) \times P_{f,w} \times \frac{F_{f,w}}{F_{f,w}} \quad \text{[Expression 30]}$$

$$\Delta I_{f,w} = M_{f,w}(C_w) \times P_{f,w} \times \frac{I_{f,w}}{F_{f,w}}$$

$$\Delta R_{f,w} = M_{f,w}(C_w) \times P_{f,w} \times \frac{R_{f,w}}{F_{f,w}}$$

$$v'(x) = ([x+r]+1-(x+r)) \times v([x+r]) + ((x+r)-[x+r]) \times v([x+r]+1) \quad \text{[Expression 31]}$$

$$P(n,t+T) = F^T(P(n,t)) = P(n,t) \quad \text{[Expression 32]}$$

$$D_n = \sum_{i=0}^{T-1} D(F^i(P(n, t+i))) \quad \text{[Expression 33]}$$

$$D0_n \cdot D1_n < 0 \qquad \text{[Expression 34]}$$

$$D0_n = \sum_{i=0}^{T-1} D(F^i(P(n, t+i))) \qquad \text{[Expression 35]}$$

$$D1_n = \sum_{i=T}^{2T-1} D(F^i(P(n, t+i)))$$

$$B'(t) = B \times M(t) \qquad \text{[Expression 36]}$$

$$D_n = \sum_{i=0}^{T-1} D(F^i(P(n, t+i))) \times M(t) \qquad \text{[Expression 37]}$$

$$D_n = D_n \text{ (if } Wm_{bitrev} > 0) \qquad \text{[Expression 38]}$$
$$D_n = -D_n \text{ (if } Wm_{bitrev} < 0)$$

$$Conv(j) = \sum_{i=0}^{T'-1} M(t + j + i) \times M(t + i) \qquad \text{[Expression 39]}$$

$$D_n = \max_{0 \leq j \leq T'} \left( \sum_{i=0}^{T-1} D(F^i(P(n, t+i))) \times M(t+j) \right) \qquad \text{[Expression 40]}$$

$$D_n = \sum_{i=0}^{T-1} D(F^i(P(n, t+i))) \times \sin(S(t)) \qquad \text{[Expression 41]}$$

TABLE 1

| | |
|---|---|
| DFT | Discrete Fourier Transform. Process for obtaining the frequency component of digital audio data. |
| FFT | Fast Fourier Transform. Algorithm for the performance of a discrete Fourier transform. The same effect can be obtained when FFT in the specification is replaced another DFT: however, the processing time is increased. |
| IFFT | Inverse Fast Fourier Transform. |
| Time domain | Space, before FFT, where the PCM wave of digital audio data is present. |
| Frequency domain | Space where a frequency component is present after the FFT has been performed for digital |
| Frame | An embedding system and a detection system in this invention extract a constant number of samples from digital data, and perform a FFT for the samples. Digital data consisting of a constant number of samples is called one frame. |
| Window | In this invention, before a FFT is performed or after an IFFT is performed for embedding or direction, digital data is multiplied by a specific function. This process is called "windowing⇋, and the function to be multiplied is called a "window function⇋, Basically, a sine function is employed as the window function; however, another function that satisfies a condition may be employed. |
| Additive information | Information to be embedded in digital data; copyright information, copying and reproduction permission conditions, music names or words. First, the information is represented as a bit sequence consisting of 0s and 1s, and then, by replacing 0s by -1s, the obtained information is actually used for embedding. |
| Original sound | Digital audio data in which no information has been embedded yet. |
| Embedding signal | A signal equivalent to a digital data change during the embedding process. This term is used for the time domain and the frequency domain. |
| Frequency band | In this invention, all the frequency bands are sorted into several frequency bands, and one bit is embedded in each band (there are exceptions). |
| Mask | A sequence of +1s and -s that is acknowledged by the embedding system and the detection system. This determines whether the frequency composed of digital data should be increased or decreased in the embedding process. Also in the detection process, the mast determines whether the frequency component should be additive or subtracted. |

TABLE 1-continued

| | |
|---|---|
| Frame synchronization | This process is required for conventional frequency domain detection; however, it is not required for the deection performed by this invention. A process for determining the range of digital data that was used as a frame in the embedding process. |
| Bit detection value | A numerical value used for the detection process to determine each bit of additive information embedded in digital data. |
| Cycle synchronization | One of the processes used for the invention, for determining the first frame. |
| Frame shift | A distance between the first obtained by the FFT in the detection process and the first frame in the embedding process. This shift is unknown at the beginning of the detection process. |

TABLE 2

| | |
|---|---|
| N | The number of sample included in one frame. |
| n | An index used to represent he position of a sample. A positive or negative integer. |
| B | The number of bits of additive information to be embedded. |
| b | An index used to represent the position of a sample. A naural number 8 or smaller. |
| W | The number of frequencies used for embedding |
| w | An index used to represent the position of a frequency. A natural number W or smaller. |
| F | The number of frames used for one embedding. |
| f | An index used to represent the position of a frame. A natural number F or smaller. |
| a(f,n) | The n-th sample value in a frame f of digital audio data. Since frames are overlapped, a(f + 1,n) ≡ a(f,n + N/2). After the embedding, a' (f,n) may be employed. |
| aw(f,n) | The n-th sample value in a frame f after the windowing of digital audio data. After the embedding, aw' (f,n) may be employed. |
| w(n) | Window function. |
| lower(b) | The minimum frequency band in which the b-th bit is to be embedded. |
| upper(b) | The maximum frequency in a frequency band in which the b-th bit is to be embedded. |
| CB | A sequence of additive information to be embedded. Constituted by $CB_b$. |
| $CB_b$ | A b-th value of additive information to be embedded. A value of +1 or -1 |
| C | A sequence of additive information to be embedded. A frequency is used as a subscript. |
| $C_w$ | A value of additive information to be embedded at frequency w. Either a value of +1 or -1 |
| M | A matrix of masks having F rows and W columns. |
| $M_{f,w}$ | Mask for frame f and frequency w. A value of +1 or -1. This may be employed as the abbreviation $M_{f,w}$ (C). |
| $M_{f,w}(C)$ | Mask for frame f and frequency w, used for embedding additive information C. a value of +1 or -1. |
| $F_{f,w}$ | A frequency component vector for frame f and frequency w. Includes a real number component and an imaginary number component. |
| $F_{f,w}'$ | A frequency component vector after the embedding. |
| $F_{f,w}$ | An amplitude for frame f and frequency w. F' may be employed after the embedding. |
| $I_{f,w}$ | An imaginary number component for frame f and frequency w. I' may be employed after the embedding. |
| $R_{f,w}$ | A real number component for frame f and frequency w. R' may be employed after the embedding. $F_{f,w} = |F_{f,w}| = \sqrt{R_{f,w}^2 + I_{f,w}^2}$ is established. |
| $\Delta F_{f,w}$ | An embedding signal of frame f and frequency w. A vector in a frequency domain. $F_{f,w}' = F_{f,w} + \Delta F_{f,w}$ |
| $\Delta I_{f,w}$ | The imaginary number component of an embedding signal of frame f and frequency w. $I_{f,w}' = I_{f,w} + \Delta I_{f,w}$ |
| $P_{f,w}$ | Permissible range obtained for frame f and frequency w by using an auditory psychological model |
| $C_b$ | A detection value for b-th additive information. A floating point number. |
| $C_b(s)$ | A detection value for the b-th additive information while assuming an s frame shift. |

TABLE 2-continued

| | |
|---|---|
| $C_{+,b}$ | A detection value obtained while assuming +1 is embedded in the b-th additive information. A floating point number |
| $C_{+,b}(s)$ | $C_{+,b}$ while assuming an s frame shift. |
| $S_s$ | A cycle synchronization value while assuming an s frame shift. A floating point number |
| $T_b$ | A threshold value for determining the reliability of a bit. A constant set in advance |
| TWM | A threshold value for determining the presence of a watermark. A constant set in advance. |

What is claimed is:

1. An electronic watermarking system, for embedding additive information in digital data, for which one frame is defined as including N samples extracted from digital data and a current frame is defined as a frame that is overlapped by M samples (0<M≦N/2) of a preceding frame, comprising:
   (1) a frequency domain transformation unit, for multiplying a frame extracted from digital data by a window function, and for using the results to perform a Fourier transform and thus obtain a frequency component for said digital data;
   (2) a frequency domain embedding unit, for employing bit information for additive information, and a frequency band for said frequency component to change the amplitude of said frequency component in said digital data obtained by said frequency domain transformation unit;
   (3) a time domain transformation unit, for performing an inverse Fourier transform to return, to a time domain signal, said frequency component whose amplitude has been changed by said frequency domain embedding unit; and
   (4) an additive information embedding frame generator, for multiplying, by a window function, said time domain signal obtained by said time domain transformation unit, and for superimposing overlapped frames to generate a frame wherein said additive information is embedded.

2. An electronic watermarking system according to claim 1, wherein, to change said amplitude of said frequency component of said digital data, said frequency domain embedding unit (2) employs bit information for additive information and the values of a mask, determined in advance in accordance with a frequency band, with which said frequency component is to be increased or decreased.

3. An electronic watermarking system according to claim 2, wherein the values of said mask corresponding to all the frequencies included in one frequency band are equalized.

4. An electronic watermarking system according to claim 2 or 3, wherein, as the frequency increases, the width of said frequency band is extended.

5. An electronic watermarking system according to claim 1, wherein in changing said amplitude of said frequency component of said digital data, said frequency domain embedding unit employs bit information for additive information and the values of a mask determined in advance in accordance with a frequency band.

6. An electronic watermarking system according to claim 5, wherein the values of said mask corresponding to frequencies included in one frequency band are equalized.

7. A computer program product comprising a computer usable medium having computer readable program code means embodied therein for causing additive information to be embedded into digital data, the computer readable program code means in said computer program product comprising computer readable program code means for causing a computer to effect the functions of the system in claim 1.

8. An electronic watermarking method, for embedding additive information in digital data, whereby one frame is defined as including N samples extracted from digital data, and a current frame is defined as a frame that is overlapped by M samples (0<M≦N/2) of a preceding frame, comprising the steps of:
   (1) extracting one frame as a current frame from digital data;
   (2) multiplying said current frame by a window function;
   (3) performing a Fourier transform for the resultant current frame to obtain a frequency component for said current frame;
   (4) changing an amplitude of said frequency component in accordance with bit information for additive information;
   (5) performing an inverse Fourier transform for the resultant frequency component;
   (6) multiplying, by said window function, said frequency component obtained using said inverse Fourier transform; and
   (7) adding an (N-M)-th sample, from the end of a preceding frame processed in the same manner as said steps (1) to (6), to an M-th sample, from the bead of said current frame processed at said step (6), and generating one new frame including N samples.

9. An electronic watermarking method according to claim 8, wherein, at said step (4) of changing said amplitude of said frequency component, said amplitude is changed by employing bit information for additive information and the values of a mask, determined in advance in accordance with a frequency band, with which said frequency component is to be increased or decreased.

10. An electronic watermarking method according to claim 9, wherein the values of said mask corresponding to all the frequencies included in one frequency band are equalized.

11. An electronic watermarking method according to claim 9 or 10, wherein, as the frequency increases, the width of said frequency band is extended.

12. An article of manufacture comprising a computer usable medium having computer readable program code means embodied therein for causing additive information to be embedded into digital data, the computer readable program code means in said article of manufacture comprising computer readable program code means for causing a computer to effect the steps of claim 8.

13. A computer-readable recording medium on which a program for embedding additive information in digital data is stored, said program defining one frame as including N samples extracted from digital data and defining a current frame as a frame that is overlapped by M samples (0<M≦N/2) of a preceding frame, and permitting a computer to execute:
   (1) a frequency domain transformation function, for multiplying a frame extracted from digital data by a window function, and for using the results to perform a Fourier transform and thus obtain a frequency component for said digital data;
   (2) a frequency domain embedding function, for employing bit information for additive information, and a frequency band for said frequency component to change the amplitude of said frequency component in said digital data obtained by said frequency domain transformation function;

(3) a time domain transformation function, for performing an inverse Fourier transform to return, to a time domain signal, said frequency component whose amplitude has been changed by said frequency domain embedding function; and (4) an additive information embedding frame generation function, for multiplying, by a window function, said time domain signal obtained by said time domain transformation function, and for superimposing overlapped frames to generate a frame wherein said additive information is embedded.

14. An electronic watermarking system for embedding additive information into digital data, said system comprising:

a frequency domain transformation unit for multiplying a current frame extracted from said digital data by a window function, and for using the results of the multiplication to obtain a frequency component for said digital data, wherein a frame in said system is defined as including a plurality of samples extracted from the digital data, and a current frame in said system is defined as a frame that is overlapped by at least one sample from said plurality of samples of a preceding frame;

a frequency domain embedding unit for employing bit information for additive information, and for employing a frequency band for said frequency component in changing the amplitude of said frequency component in said digital data obtained by said frequency domain transformation unit;

a time domain transformation unit for performing an inverse transform to return said frequency component whose amplitude has been changed by said frequency domain embedding unit to a time domain signal; and an additive information embedding frame generator for multiplying said time domain signal obtained by said time domain transformation unit by the window function, and for superimposing overlapped frames to generate a frame wherein said additive information is embedded.

15. An electronic watermarking method for embedding additive information into digital data, said method comprising:

defining a frame as including a plurality of samples extracted from the digital data;

defining a current frame as a frame that is overlapped by at least one of said plurality of samples of a preceding frame;

extracting one frame as a current frame from digital data;

multiplying said current frame by a window function;

performing a transform for the resultant current frame to obtain a frequency component for said current frame;

changing an amplitude of said frequency component in accordance with bit information for additive information;

performing an inverse transform for the resultant frequency component;

multiplying, by said window function, said frequency component obtained using said inverse transform;

adding an additional sample, from the end of a preceding frame processed in the same manner as in said steps of extracting, multiplying, performing, changing, performing and multiplying to a previous sample from the head of said current frame processed at said step of multiplying, and;

generating one new frame including the plurality of samples.

16. An article of manufacture comprising a computer usable medium having computer readable program code means embodied therein for causing additive information to be embedded into digital data, the computer readable program code means in said article of manufacture comprising computer readable program code means for causing a computer to effect the steps of claim 15.

* * * * *